United States Patent [19]

Clarke

[11] 4,373,768

[45] Feb. 15, 1983

[54] THERMOSTATIC FIBER OPTIC WAVEGUIDES

[75] Inventor: Raymond Clarke, Sunnyvale, Calif.

[73] Assignee: Raychem Corporation, Menlo Park, Calif.

[21] Appl. No.: 136,076

[22] Filed: Mar. 31, 1980

[51] Int. Cl.³ .............................................. G02B 5/172
[52] U.S. Cl. ............................. 350/96.34; 350/96.30; 350/96.33; 356/44
[58] Field of Search ............... 350/96.29, 96.30, 96.31, 350/96.32, 96.33, 96.34, 320; 356/43, 44

[56] References Cited

U.S. PATENT DOCUMENTS

| Re. 25,727 | 2/1965 | Haluska | 556/445 |
|---|---|---|---|
| 2,719,098 | 9/1955 | Goldman . | |
| 3,208,342 | 9/1965 | Nethercot . | |
| 3,262,810 | 7/1960 | Campbell . | |
| 3,389,114 | 6/1968 | Burzynski et al. . | |
| 3,451,838 | 6/1969 | Burzynski et al. . | |
| 3,460,980 | 8/1969 | Burzynski | 428/447 |
| 3,609,731 | 9/1971 | Evans | 340/227 C |
| 3,625,589 | 12/1971 | Snitzer | 350/96.29 |
| 3,819,250 | 6/1974 | Kibler | 350/96.29 |
| 3,841,731 | 10/1974 | Midwinter . | |
| 3,933,678 | 1/1976 | Graham | 350/96.34 X |
| 3,944,811 | 3/1976 | Midwinter | 350/96.34 |
| 4,114,981 | 9/1978 | Ishida et al. | 350/96.33 |
| 4,151,747 | 5/1979 | Gottlieb et al. | 73/339 R |
| 4,201,446 | 5/1980 | Geddes et al. . | |
| 4,203,326 | 5/1980 | Gottlieb et al. . | |
| 4,270,840 | 6/1981 | Uchida et al. | 350/96.34 |
| 4,278,349 | 7/1981 | Sander | 356/44 |
| 4,288,159 | 9/1981 | Newman | 356/44 |

FOREIGN PATENT DOCUMENTS

| 7913310 | 2/1979 | France . | |
|---|---|---|---|
| 54-8542 | 1/1979 | Japan | 350/96.29 |
| 886683 | 1/1962 | United Kingdom . | |
| 887755 | 1/1962 | United Kingdom . | |
| 1134027 | 11/1968 | United Kingdom | 356/43 |
| 1184028 | 3/1970 | United Kingdom | 350/96.29 |
| 1438961 | 6/1976 | United Kingdom . | |
| 1527519 | 10/1978 | United Kingdom . | |
| 1582768 | 1/1981 | United Kingdom . | |
| 495559 | 2/1976 | U.S.S.R. . | |

OTHER PUBLICATIONS

Yeung et al., "Effect of Temperature on Optical Fiber Transmission," *Applied Optics*, vol. 17, No. 23, Dec. 1978, pp. 3703-3705.

Yeh et al., "How Does One Induce Leakage . . . ", *Agard Conf. Proc. N 219*, London, May 1977, pp. 26.1-26.5.

"Review of NASA Fiber Optics Tasks," *Agard Conf. Proc. N 219*, London, May 1977, pp. 6.1-6.14.

Gottlieb et al., "Measurement of Temperature With Optical Fibers . . . ", *Electro-Optics Conf.*, Anaheim, Cal., Oct. 1978.

Gottlieb et al., "Non-Interferometric Measurement of Temperature . . . ," Oct. 17, 1978.

Strub, "Material for Making Resilient Light Pipes to be Mounted Without Silicon Grease", Review of Scientific Instruments, 35:10, 1268-9, Oct., 1964.

*Primary Examiner*—John D. Lee
*Attorney, Agent, or Firm*—Lyon & Lyon

[57] ABSTRACT

Fiber optic waveguides exhibiting a blackout phenomenon can be used for temperature sensing. A temperature sensing waveguide can be used in such applications as maintaining a material within a selected temperature range, freeze protection, viscosity control of liquids in pipelines, leak detection of cryogenic fluids, fire detection, application of heat-recoverable materials, and fluid level detection. Novel waveguides exhibiting blackout at selected temperatures for use in these applications are described. Among the novel waveguides are those having a cladding comprising a polyalkylphenyl siloxane and those having a cladding comprising a cross-linked polymethylalkyl siloxane. Also described are waveguides where only a section of the waveguide exhibits blackout and methods for making such waveguides.

59 Claims, 11 Drawing Figures

* INCREASE IN ATTENUATION VS ROOM TEMPERATURE ATTENUATION

* INCREASE IN ATTENUATION VS ROOM TEMPERATURE ATTENUATION

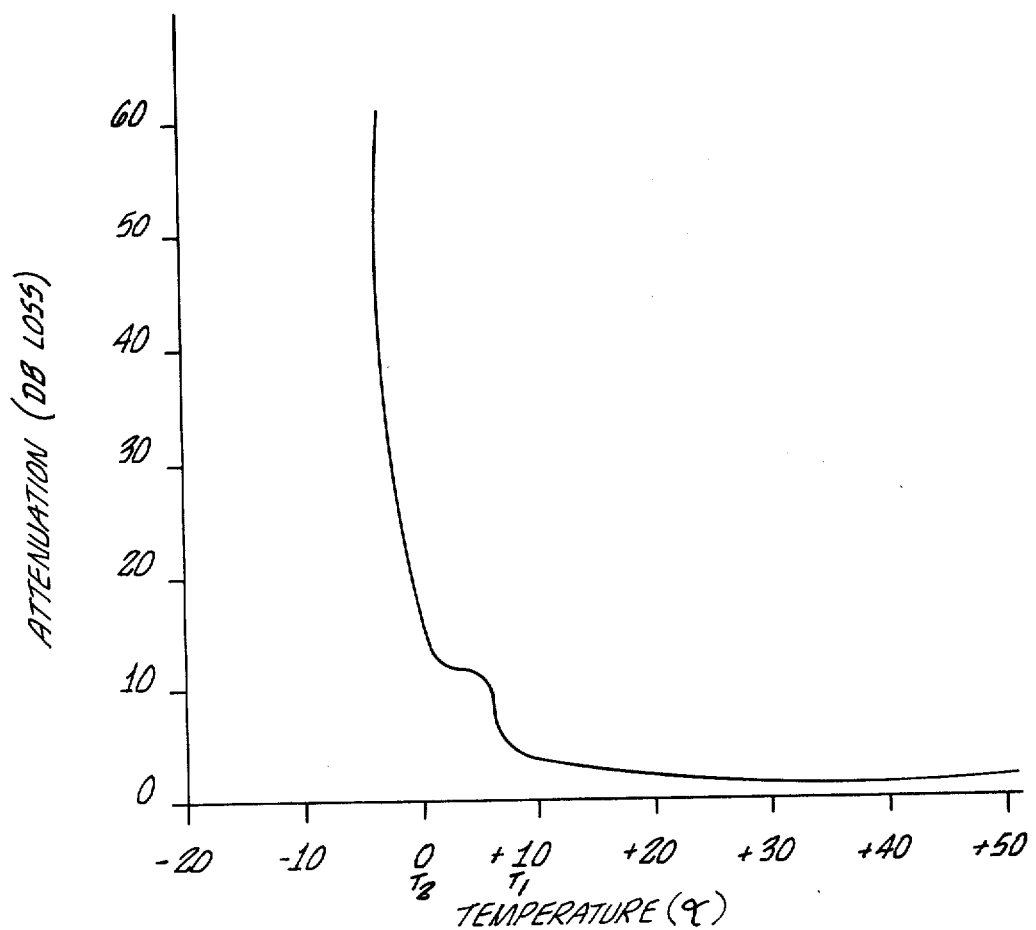

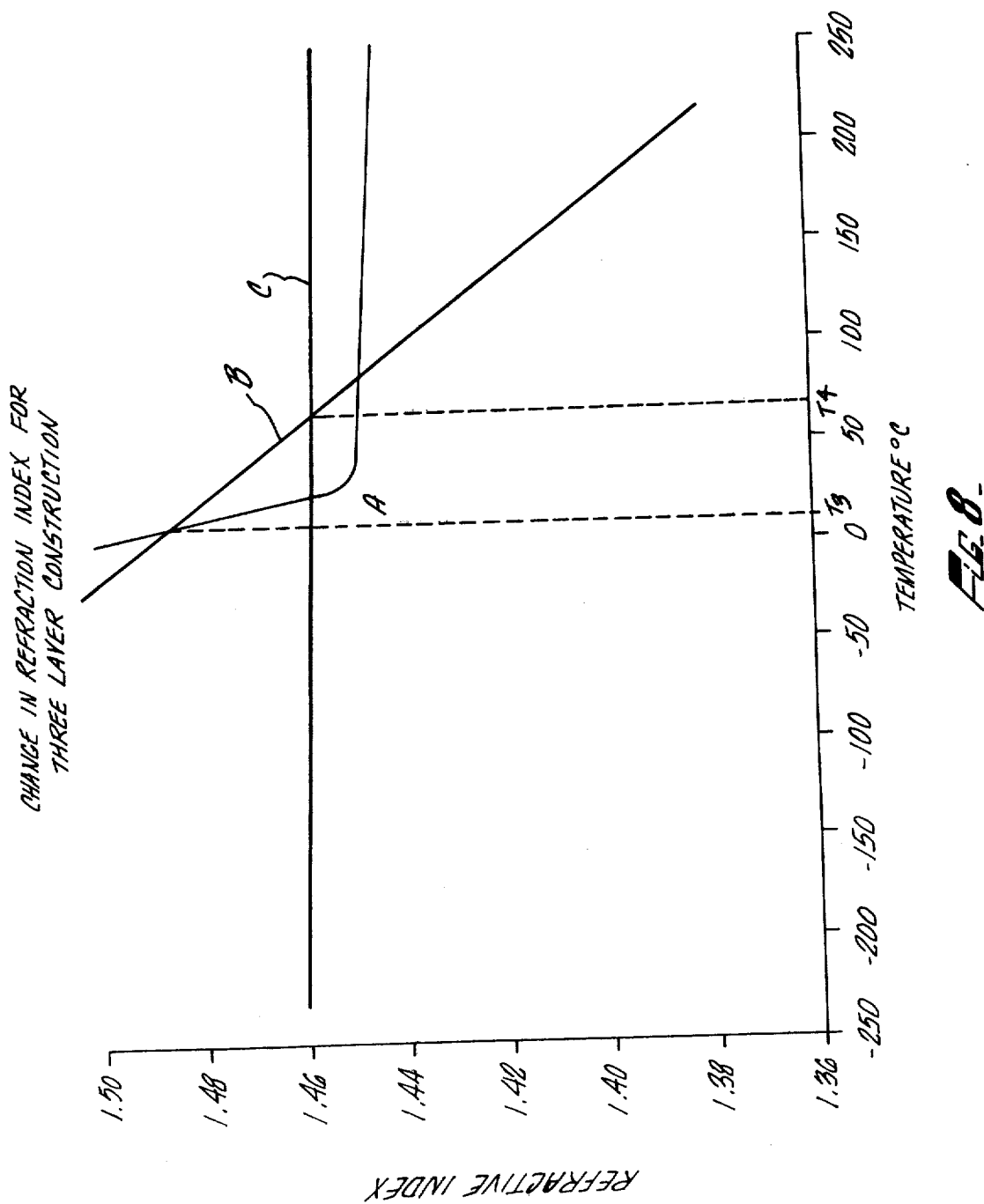

* INCREASE IN ATTENUATION VS. 100°C ATTENUATION

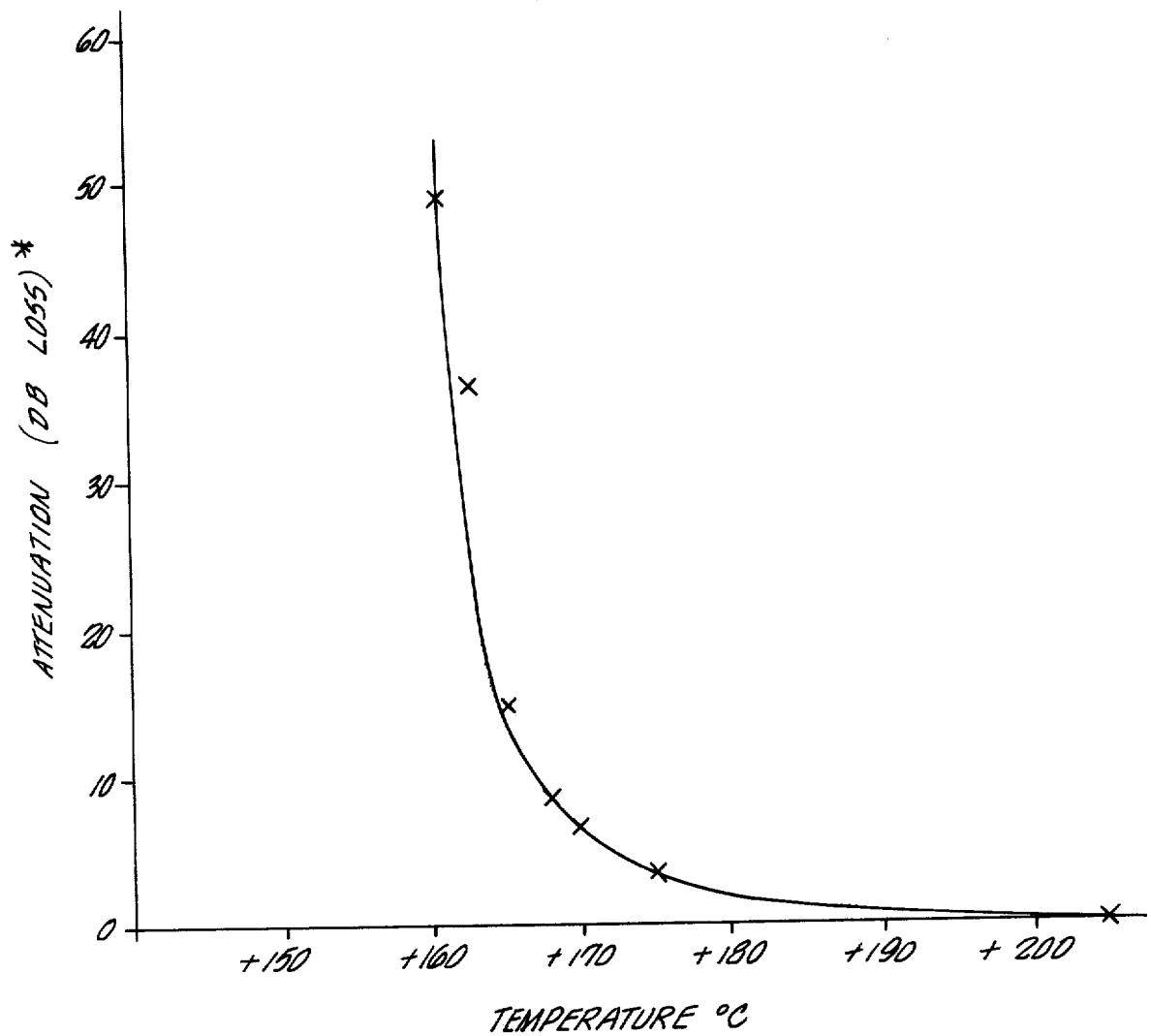
FIG_11
*INCREASE IN ATTENUATION VS 200°C ATTENUATION

THERMOSTATIC FIBER OPTIC WAVEGUIDES

CROSS-REFERENCE

This application is related to copending and coassigned application Ser. No. 136,057, filed Mar. 31, 1980 by Raymond Clarke and Chester Sandberg, entitled "Fiber Optic Temperature Sensing", which is incorporated herein by this reference.

BACKGROUND OF THE INVENTION

The present invention is directed to novel fiber optic waveguides for use in fiber optic temperature monitoring systems.

The use of fiber optics for transmitting information has recently received a great deal of attention because of the light weight, security, safety, and electrical isolation that can be obtained with a fiber optic system. It has also been proposed to use optical fibers for non-interferometric measurement of temperatures in a paper by Gottlieb et al presented at the Electro-Optics conference in Anaheim, Calif. in October 1978. Gottlieb et al proposed that the loss of light to the cladding of a waveguide depends upon the temperature of the waveguide. In U.S. Pat. No. 4,151,747 issued to Gottlieb et al, there are described fiber optic temperature monitoring systems.

There are many applications in which it would be advantageous to use a fiber optic system for temperature measurement and monitoring, for which no system has been available. For example, when monitoring the temperature of flammable fluids, it would be preferred to use a non-electrical system to avoid the explosion hazard associated with electrical temperature monitoring systems. In some applications, such as monitoring the temperatures of electrical generators, the high RF noise produced interferes with conventional remote sensing methods. The use of fiber optic systems for monitoring temperatures in these applications and other applications has been hampered by the non-availability of suitable waveguides which have light transmission properties that vary substantially at useful temperatures.

In view of the foregoing, there is a need for system for monitoring temperatures using fiber optic waveguides.

SUMMARY

The present invention is directed to novel fiber optic waveguides for use in methods and systems for temperature sensing. The waveguides used comprise a core and a cladding disposed on and around the exterior surface of the core, where at least a portion of the waveguide exhibits blackout at a selected blackout temperature. By "blackout", there is meant that on the side of the blackout temperature or temperature range, the waveguide transmits light, but on the opposite side of the blackout temperature or temperature range, the waveguide transmits light only with substantial attenuation, i.e., usually substantially no light is transmitted through the waveguide. This blackout phenomenon occurs when the index of refraction of the core and the index of refraction of the cladding become about equal. The blackout can also be the result of crystallization of the cladding, crystallization causing a change in the refractive index of the cladding and/or light scattering.

In applications where it is desirable to keep water from freezing, it is necessary that the waveguide exhibit a blackout temperature slightly above 0° C. Such a waveguide can be formed with a fiber core material and a cladding having a crystalline melting point slightly greater than 0° C. so that the refractive index of the cladding is less than the refractive index of the core at temperatures greater than the crystalline melting point of the cladding and the refractive index of the cladding is greater than or equal to the refractive index of the core at temperatures less than or equal to the crystalline melting point of the cladding. Claddings having a crystalline melting point at temperatures slightly greater than 0° C. are claddings comprising polydialkyl siloxane where one alkyl side chain comprises at least 10 carbon atoms and the other side chain is a methyl, ethyl, or propyl group.

Another waveguide which can exhibit blackout at temperatures slightly above 0° C. is a waveguide having a cladding comprising a polyalkylphenyl siloxane, where the phenyl content of the siloxane based upon the total weight of the siloxane is at least about 15%.

Another useful waveguide is one that transmits light within a selected temperature range $T_1$ to $T_2$. Such a waveguide comprises a high loss core, a light transmissive layer disposed on and around the core, and an exterior cladding disposed on and around the light transmissive layer. The refractive index of the light transmissive layer is greater than the refractive indices of both the core and the exterior cladding at temperatures within the selected temperature range, is less than or equal to the refractive index of the core at temperatures less than or equal to $T_1$, and is less than the refractive index of the exterior cladding at temperatures greater than or equal to $T_2$.

In some applications, it is desirable that once a waveguide undergoes a substantial change in its light transmission properties, that change be permanent and irreversible.

In some applications, only a portion of a waveguide needs to exhibit blackout as a result of temperature change. A single waveguide can include a plurality of sensing elements that exhibit blackout at different temperatures, or a plurality of sensing elements, each of which exhibits blackout at the same temperatures. The sensing elements can be adjacent to each other or separated by sections of the waveguide that do not exhibit blackout.

These novel waveguides provide the opportunity to use fiber optic systems in applications never heretofore thought possible. It is now possible to tailor make waveguides so that they blackout at selected temperatures. Among the applications for these waveguides are methods and systems for maintaining a material within a selected temperature range and methods and systems for detecting fires.

DRAWINGS

These and other features, aspects, and advantages of the present invention will become better understood with reference to the appended claims, the following description, and accompanying drawings, where:

FIG. 1 is a graph of calculated change in refractive index vs. temperature for two materials useful for preparing waveguides;

FIG. 2 presents graphs of attenuation vs. temperature for different types of waveguides, demonstrating the blackout that can occur as the temperature of the waveguide is reduced;

FIG. 6 is a graph of attenuation vs. temperature for a waveguide as shown in FIG. 5 where the core is glass and the outer two layers are cladding materials;

FIG. 8 is a graph of refractive index vs. temperature of the components of the three-layer waveguide upon which FIG. 7 is based;

FIGS. 10 and 11 are graphs of attenuation vs. temperature for the waveguides of Examples 1 and 2, respectively, presented hereinbelow.

DESCRIPTION

Figure 1:
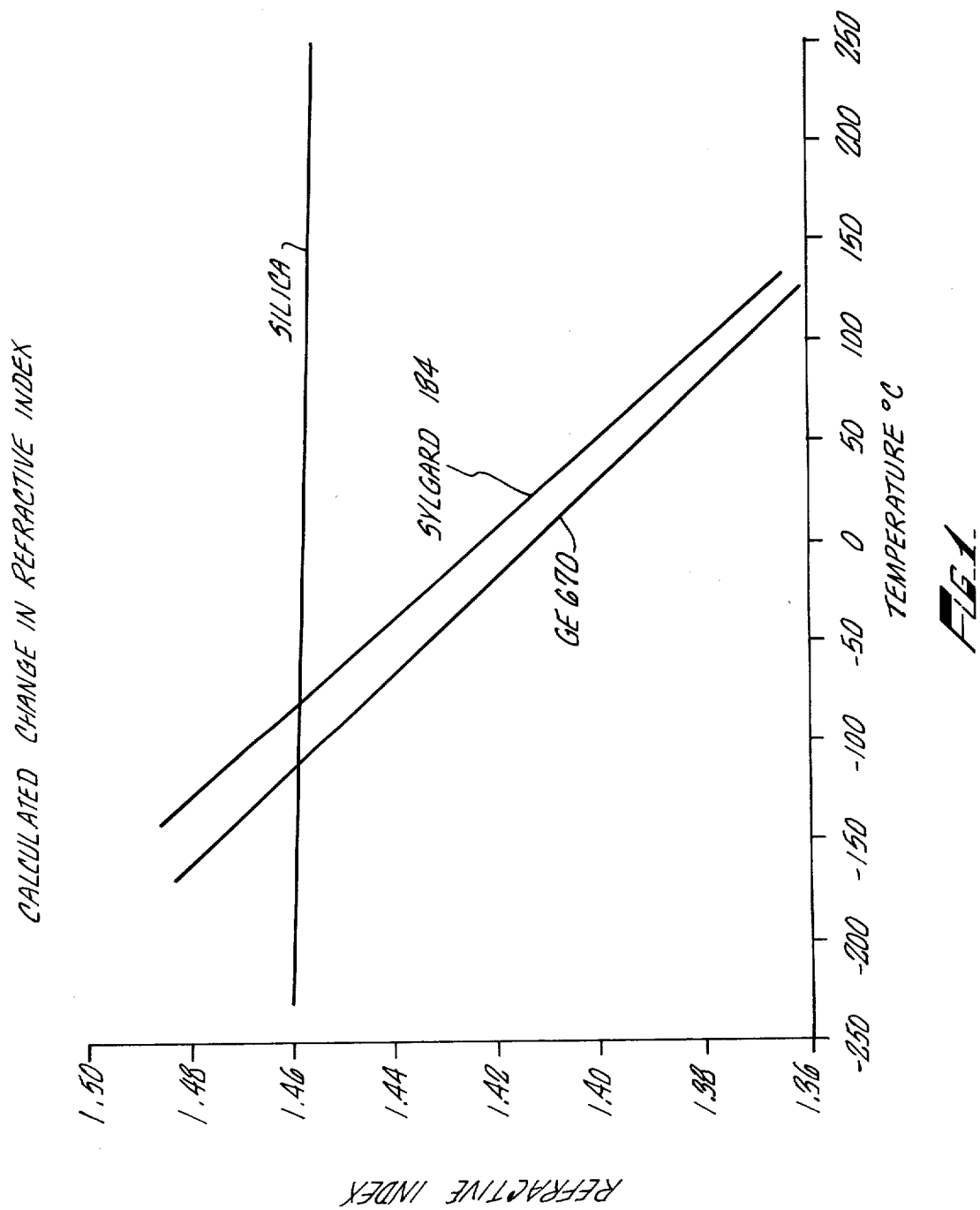

The present invention is directed to fiber optic waveguides useful as temperature sensors. Use is made of the principle that waveguides can be prepared so that at a selected temperature or within a selected temperature range, the waveguide can exhibit blackout, i.e., the waveguide transmits substantially no light. Blackout is detected with a monitor in that it is determined that the light transmission property of the waveguide has undergone a substantial change. As used herein, the term "substantial change" in light transmission property refers to a decrease or increase of at least 3 db (decibels), and preferably at least about 5 db, amounts that easily can be detected with state-of-the-art monitors. For example, a substantial change can be a change in attenuation from 5 db up to 8 db, from 20 db up to 25 db, 10 db down to 7 db, or 25 db down to 20 db.

The "blackout temperature" is the temperature or temperature range where blackout occurs. It is characterized by a substantial change in attenuation over a very small temperature change, and generally over a temperature change of 3° C. or less. In other words, preferably a plot of attenuation vs. temperature of the waveguide has a positive slope of at least about 1 db/(1° C.), or a negative slope of about −1 db/(1° C.) or less, at the blackout temperature.

As used herein, the term "sensing element" refers to a waveguide or a portion of a waveguide that exhibits blackout at one or more selected temperatures or temperature ranges.

To determine if a substantial change in the light transmission property of a waveguide has occurred, it is necessary to monitor the intensity of light transmitted by the waveguide. As used herein, the term "monitoring" the intensity of light refers to monitoring light at either end of the waveguide using conventional monitoring equipment. For example, by using an optical time domain reflectometer such as Model OTDR-103 sold by Orionics, Inc. of Albuquerque, N. Mex., it is possible to monitor for transmitted light at the same end of a waveguide at which light pulses are launched into the waveguide.

In one version of the present invention, a waveguide can undergo a permanent change in its light transmission properties after its temperature is increased or lowered to a selected temperature. By the term "permanent" change, there is meant that the change in light transmission properties is irreversible. For example, a waveguide can be prepared that until it is heated to a temperature greater than about 100° C., it is substantially incapable of transmitting light, but once it is heated to 100° C., it transmits light, even if subsequently, the temperature of the waveguide is lowered to below 100° C.

Waveguides consisting of a variety of materials have been developed in the prior art. For example, waveguides consisting of a glass fiber core and glass cladding, glass cladding and a liquid core, a polymeric fiber core and polymeric cladding, and a glass fiber core and polymeric cladding are known. U.S. patent application Ser. No. 964,506 filed by Ellis et al on Nov. 29, 1978, now U.S. Pat. No. 4,290,668, which is incorporated herein by reference, is directed to waveguides comprised of a quartz glass core and polymeric cladding of polydimethyl siloxane. U.S. Pat. No. 3,819,250 issued to Kibler describes a waveguide comprising a quartz cladding and a liquid core which can be carbon tetrachloride.

In order for a waveguide to transmit light, it is necessary that the refractive index of the cladding be less than the refractive index of the core. When the refractive index of the core and the cladding are about equal, light is no longer contained by the cladding and blackout occurs. For example, FIG. 1 presents the calculated change in refractive index vs. temperature for silica and two commercially-available siloxanes, Sylgard 184 and GE 670. Sylgard 184 is a branched polydimethyl siloxane with some phenyl substitution available from Dow Corning. GE 670 is a branched polydimethyl siloxane available from General Electric.

Figure 2:
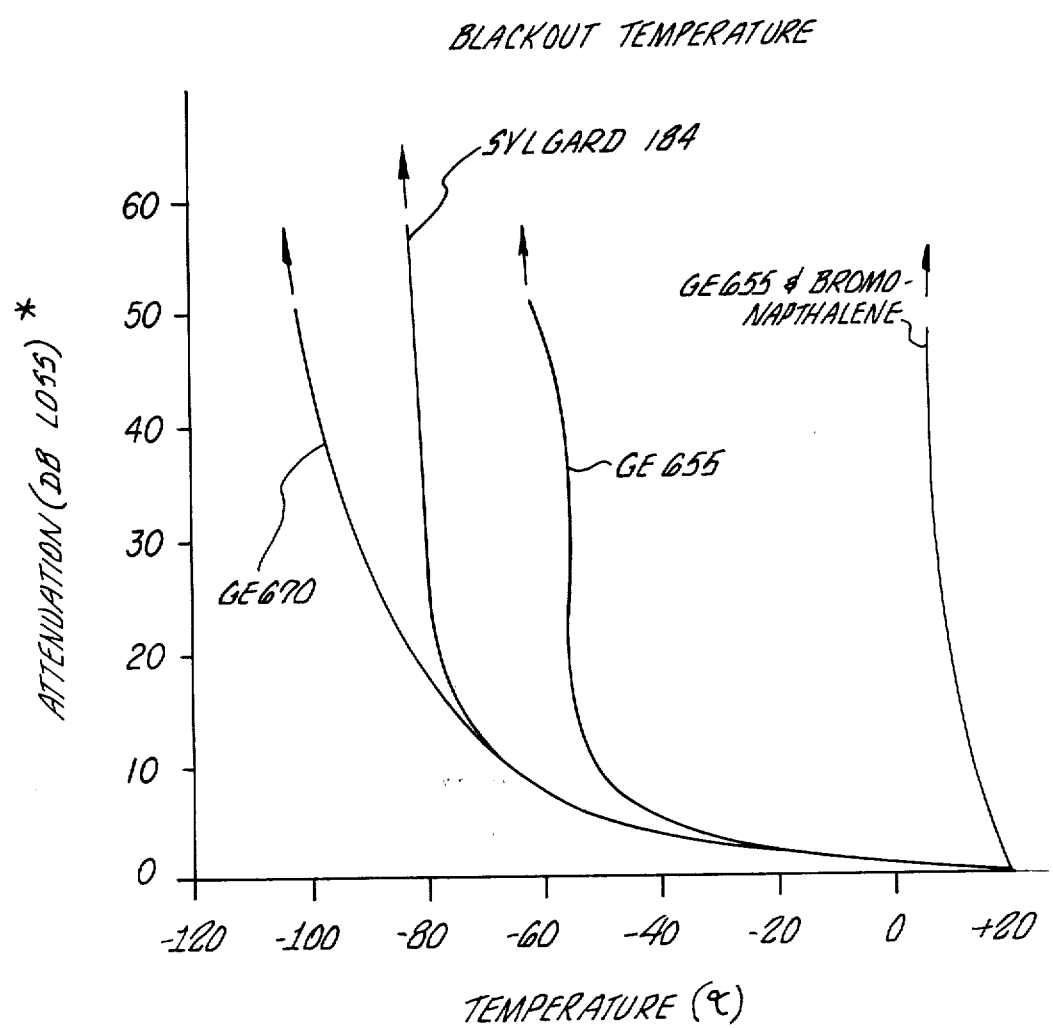

Similarly, FIG. 2 shows the blackout phenomenon for a number of commercially available siloxanes coated on a silica fiber. FIG. 2 presents attenuation vs. temperature for GE 670, Sylgard 184, and GE 655 claddings on a silica core. The waveguides were about 100 meters long. The silica core was about 200 microns in diameter and the cladding was about 20 microns thick. GE 655 is branched polydimethyl siloxane with some phenyl substitution. The data presented in FIG. 2 were obtained by measuring the attenuation of the waveguide resulting from the waveguide being cooled at 2° C./minute. The blackout temperatures shown for the GE 670 and Sylgard 184 clad fibers correlate approximately with the crossover points in refractive index shown in FIG. 1.

In practice, as the temperature of one of the waveguides of FIG. 2 is decreased, a substantial change in attenuation is noted until eventually no light is transmitted. This phenomenon occurs even if only a very short portion of a long waveguide is cooled to the blackout temperature. For example, cooling a one centimeter length of a one kilometer long waveguide to the blackout temperature can be detected as a substantial increase in attenuation of transmitted light.

The reverse of this phenomenon also occurs. As the GE 670/silica, Sylgard 184/silica, and GE 655/silica waveguides are heated from a temperature of −100° C. to a temperature greater than −40° C., the amount of light transmitted by the waveguide increases. Initially, substantially no light is transmitted, until eventually light is transmitted by the waveguides.

Figure 3:
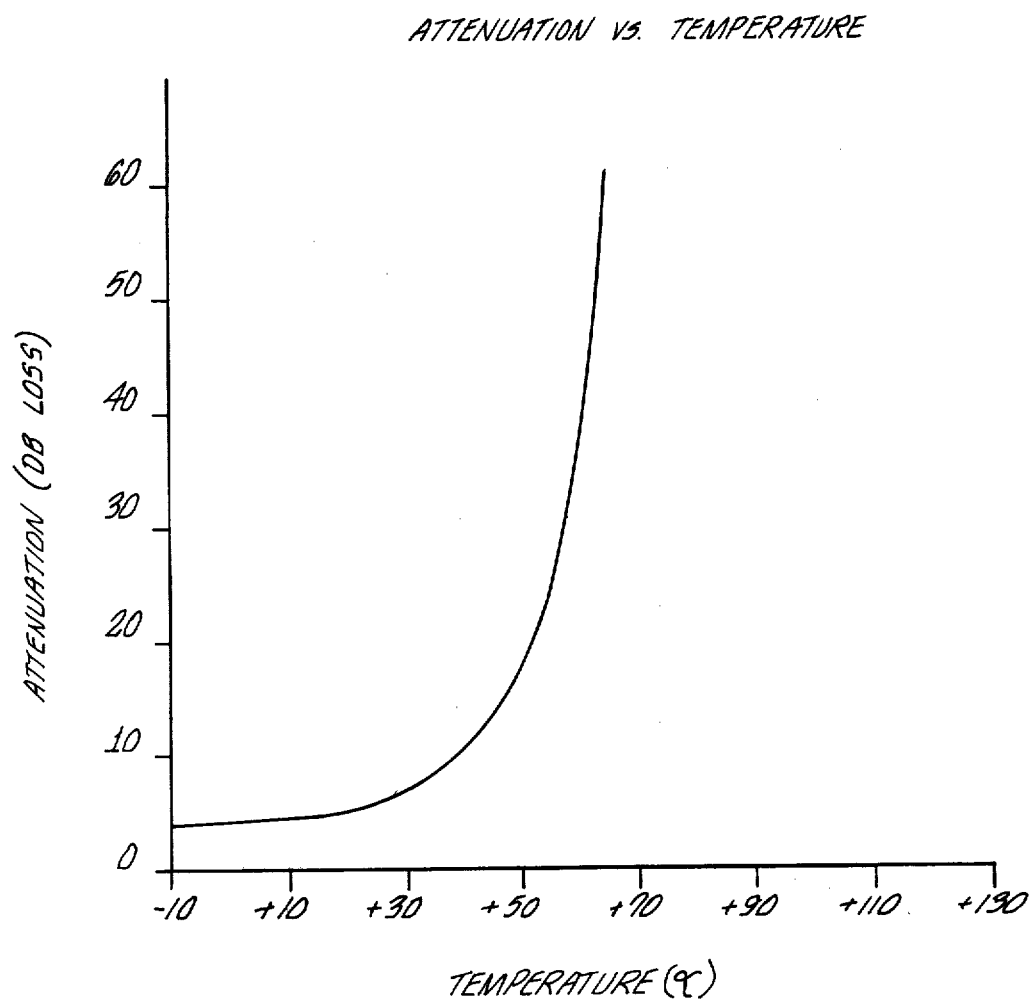
FIG. 3 is a graph of attenuation vs. temperature for a waveguide and demonstrates that blackout can occur when the temperature of a waveguide is increased.

In some applications, it is desirable that the waveguide exhibit blackout as its temperature is raised. The attenuation of such a waveguide is shown in FIG. 3, where the waveguide exhibits blackout at about 50° C. At temperatures less than about 50° C., the waveguide transmits light. A waveguide with a cladding of silica, the exterior surface of which is coated with a material that will inhibit light propagation in the cladding, i.e. a light absorptive material such as polymethylphenyl siloxane having an index of refraction of about 1.50 containing about 5% by weight of carbon black, and a core of polymethylphenyl siloxane with a refractive index of 1.47 at 23° C. exhibits an attenuation vs. temperature curve similar to that shown in FIG. 3. A disadvantage with such a waveguide is that even at temperatures at which it transmits light, the amount of attenuation is substantially more than is obtained with a waveguide with a silica core because silica has much better optical properties than polymethylphenyl siloxane. However, this disadvantage is not important where only a short waveguide is required, or where a short sensing element is incorporated such as by splicing into a long waveguide, where the remainder of the waveguide has excellent light transmission properties.

Another example of the waveguide that can exhibit blackout as its temperature is increased is the waveguide having a silica cladding and a liquid core described in the above-mentioned Kibler U.S. Pat. No. 3,819,250. With a liquid core of carbon tetrachloride, blackout can occur at a temperature of about 25° C., provided the exterior surface of the silica tube is coated with a light absorptive material which prevents light propagation within the silica.

Another waveguide that exhibits blackout as its temperature is increased is one having a core of polymethylphenyl siloxane containing 12% phenyl by weight, and a cladding of a Kynar copolymer such as Kynar 7200, available from Pennwalt Corporation, which is a copolymer of vinylidene fluoride and tetrafluoro ethylene.

It is important to be able to control the temperature at which blackout occurs. For example, for heat tracing of a pipeline containing an aqueous fluid, it is desirable that blackout occur at a temperature slightly greater than freezing so that a heating element can be activated before the water freezes.

Prior art waveguides, such as those described above, exhibit blackout at temperatures of little practical significance. The present invention is directed to waveguides that exhibit blackout at temperatures of practical use and methods for preparing these waveguides. These novel waveguides exhibit blackout at selected blackout temperatures greater than about −20° C. and less than 200° C., and more preferably at temperatures greater than about 0° C. and less than 100° C., i.e. temperatures of commercial interest. Preferably the core of the novel waveguide is solid over the temperature range of desired waveguide use.

One method to control the blackout temperature of a waveguide is to vary the refractive index of the cladding, the core, or both. For example, a waveguide comprising a silica core and GE 655 cladding was soaked in bromonapthalene which has a refractive index of 1.61. This raised the refractive index of the cladding, which had the effect of raising the blackout temperature. As shown in FIG. 2, the blackout temperature of this waveguide was raised to about 5° C.

Other additives and dopants can be added to a cladding to either raise or lower its refractive index, depending upon the blackout temperature desired. Preferably the dopant used is non-volatile so that it remains permanently in the cladding or core and preferably the dopant is homogeneously dispersed in the cladding. Satisfactory dopants for siloxane claddings include monomeric high boiling materials which are compatible with the siloxane cladding. Examples of dopants which can be used to raise the refractive index of siloxane cladding are 2,2-dimethyltetraphenylcyclotrisiloxane; 1,1,1,5,5,5-hexamethyldiphenyltrisiloxane; hexaphenylcyclotrisiloxane; tetraphenylsilane; and diallyldiphenylsilane. The cladding can be irradiated with an electron beam to about 5 Mrads subsequent to imbibing in the dopant to permanently graft the dopant to the polymeric cladding. Other dopants can be introduced prior to the curing process.

Sufficient dopant is added to the cladding to bring about the requisite change in refractive index. Generally dopant is added in an amount from about 5 to about 40 parts by weight per 100 parts by weight polymeric cladding.

Other materials which may be used as dopants are low molecular weight chlorinated phenylsiloxanes and nitrile containing siloxanes.

Monomeric high boiling materials such as neopentylglycolpolyadipate and paraffin oils which are not siloxanes can be used as dopants in small quantities, but they suffer from the disadvantage that they are inadequately compatible with siloxane claddings and are expelled from the cladding with time.

Another approach that can be used to provide a waveguide with a higher blackout temperature than the blackout temperatures obtained with conventional silica/polydimethyl siloxane claddings is the development of waveguides comprised of materials heretofore not used as cladding materials. Cladding materials developed include claddings comprising a polyalkylphenyl siloxane, where the alkyl portion of the siloxane contains no more than 10 carbon atoms, and preferably is a methyl group. The phenyl content is preferably at least 15% by weight. As the phenyl content of a polymethylphenyl siloxane increases, the refractive index of the siloxane increases. Table 1 presents the refractive index of polymethylphenyl siloxanes as a function of their phenyl content. The percent by weight phenyl is based upon the total weight of the siloxane. Also presented in Table 1 is the blackout temperature of a waveguide comprising a silica core and a polymethylphenyl siloxane cladding having the specified phenyl content. All phenyl contents referred to herein were determined by ultraviolet spectroscopy.

TABLE 1

| % by Weight Ph | Refractive Index | Blackout Temp (°C.) |
| --- | --- | --- |
| 16.25 | 1.446 | 0° C. |
| 17.0 | 1.448 | 5° C. |
| 18.25 | 1.451 | 10° C. |
| 19.0 | 1.453 | 15° C. |

Cladding materials of different phenyl content can be prepared by blending methylphenyl siloxanes with different phenyl contents. However, in practice, it is found that blends which differ widely in phenyl content tend to be milky to opaque. Therefore, when blending methylphenyl siloxanes, preferably the siloxanes differ in refractive index by no more than about 0.02 and the viscosities of both siloxanes are in the range of from about 500 to about 10,000 cps as measured at 25° C.

It is also possible to cross-link methylphenyl siloxanes of different phenyl content. For example, by blending a methylphenyl siloxane having a viscosity of 2,000 cps and a phenyl content of 21% and having a terminal vinyl content of 1 mole % with a second methylphenyl siloxane having a viscosity of 2,000 cps and a phenyl content of 16%, a cladding is produced which in combination with a silica core, provides any blackout temperature required in the range of 0° to 15° C.

A polyalkylphenyl siloxane of the desired phenyl content can be prepared according to conventional polymerization techniques, where the starting materials include dialkyl chlorosilane, diphenyl chlorosilane, and alkylphenyl chlorosilane. In preparing the polyalkylphenyl siloxane, the alkyl groups can be the same or different.

Figure 4:
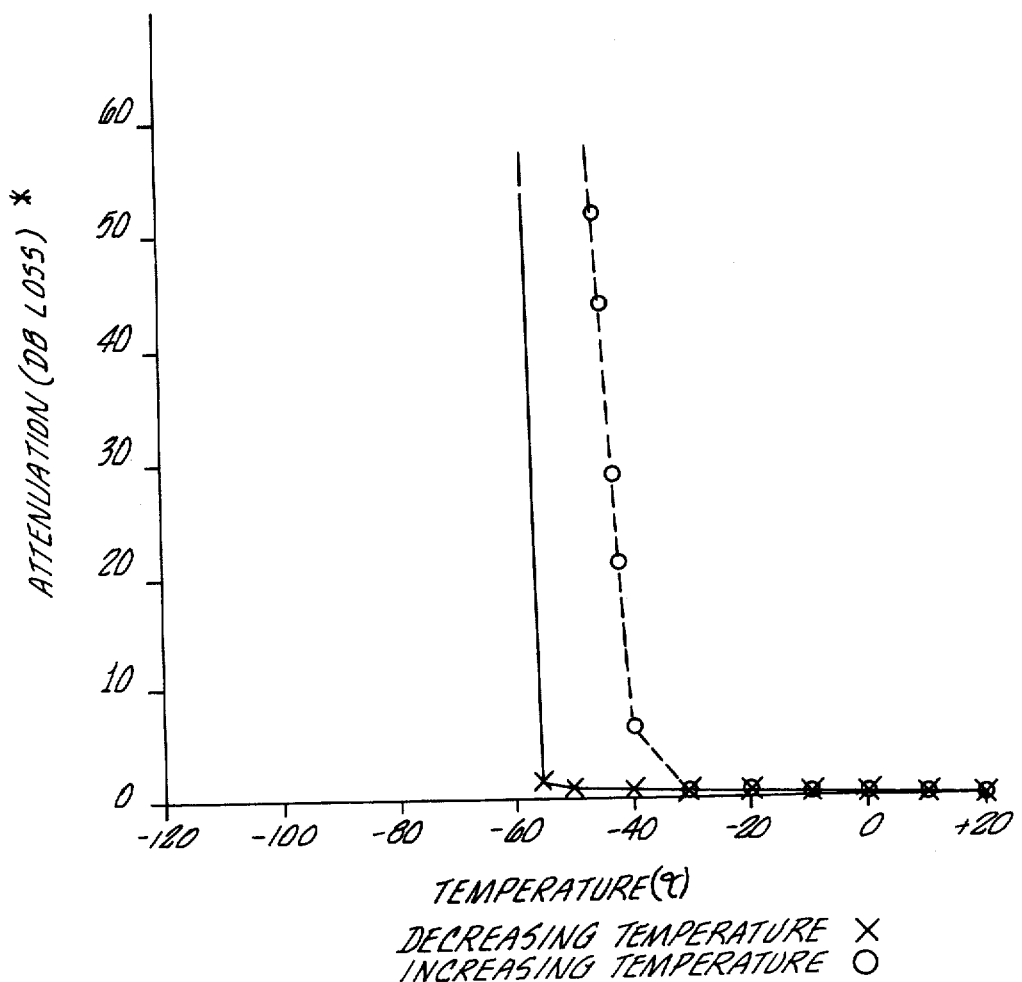
FIG. 4 is a graph of attenuation vs. temperature for a waveguide showing low temperature transmission characteristics.

Another novel waveguide has a cladding made of a material that crystallizes as its temperature is lowered. FIG. 4 presents the attenuation vs. temperature curve for a waveguide having a silica core of 200 microns, a first cladding of KE 103 having a thickness of 30 to 35 microns, and an outer cladding layer of Sylgard 184 having a thickness of 60 microns. KE 103 is a low molecular weight polydimethyl siloxane available from Shin-Etsu of Japan that crystallizes as its temperature is lowered. The outer layer of Sylgard is required because the KE 103 has poor mechanical properties. As shown by FIG. 4, the waveguide exhibits a large and sudden increase in attenuation at about −56° C. as its temperature is decreased, and also exhibits a large and sudden decrease in attenuation at about −40° C. as its temperature is increased, showing a hysteresis effect. This large and sudden change in attenuation occurs because KE 103 is a linear, low molecular weight material and is able to crystallize. It has a differential scanning calorimeter melting point of −45° C. when warmed from −120° C. at 5° C. per minute. Thus sudden and large changes in attenuation result from the KE 103 and are caused by the material changing from a crystalline to an amorphous material at its melting point and by the material changing from an amorphous material to a crystalline material at its freezing point.

At its crystallization temperature, a large increase in the refractive index of KE 103 occurs so that its refractive index is no longer less than the refractive index of the core. Thus blackout occurs. Also contributing to blackout is light scattering resulting from the crystallization.

To insure that the crystallization occurs at a specified temperature, it is believed that a nucleating agent such as fumed silica can be used to prevent the freezing point from varying as a result of supercooling of the polymer liquid.

As is evident from FIG. 4, an advantage of using a polymer that crystallizes as a cladding is that the blackout occurs over a very small temperature range. Thus, the waveguide can be used in applications where close control of the temperature of a material is essential.

To be useful in waveguides, a material that exhibits this crystallization phenomenon preferably is sufficiently optically clear to be used as a cladding, and has a refractive index lower than that of silica.

In addition to KE 103, copolymers of dimethylsiloxane and ethylene oxide meet these requirements. The refractive index and crystalline melting point of the copolymer can be altered as required by varying the molar ratio of the siloxane to the ethylene oxide and also by varying the chain length of the ethylene oxide block.

A method for making these copolymers is described in U.S. Pat. No. Re. 25,727 which is incorporated herein by this reference. Preferably the copolymer prepared has a refractive index less than that of silica (about 1.46 at 23° C.) so that it can be used as a cladding for silica cores. Particularly suitable polyethylene oxide dimethylsiloxane copolymers for water freeze protection are those whose preparation is described in Examples 1 and 2 of the 25,727 patent. These copolymers have a freezing point of 1° C. and refractive indices of 1.4595 and 1.4555, respectively. These copolymers can be protected from absorbing moisture by a water resistant exterior cladding.

Crosslinked polydialkyl siloxanes such as polydiethyl siloxane also exhibit this crystalline melting point phenomenon. Polydialkyl siloxanes for use as a cladding comprise the repeating unit:

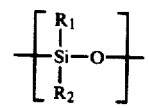

where each $R_1$ in a polymer chain is independently selected from the group consisting of methyl, ethyl, and propyl groups; and where each $R_2$ in a polymer chain is independently an alkyl group, and preferably a linear alkyl group, of at least about 10 carbon atoms, and preferably no more than about 20 carbon atoms.

These materials crystallize due to the presence of the long chain alkyl side groups. For example, polymethylhexadecyl siloxane has a melting point of 42° C., a refractive index of 1.4524 (44° C.), and a freezing point of 27° C. Preferred materials are cross-linked polymethylalkyl siloxanes, i.e. $R_1$ is a methyl group.

All the $R_1$'s and $R_2$'s can be the same or different. For example, the polydialkyl siloxane can be a homopolymer of polymethyldodecyl siloxane. Alternatively, it can be a copolymer of 30% by weight of polymethyldodecyl siloxane and 70by weight polymethyltetradecyl siloxane, which has a crystalline melting point of 3° C. In order to lower the refractive index of the polydialkyl siloxane, a portion of the side chains can be substituted by fluorine substituted groups such as tri-fluoropropyl.

The polymethylalkyl siloxanes can be prepared by reacting the alkene corresponding to the alkyl portion of the siloxane wih polymethylhydrogen siloxane in the presence of chloroplatinic acid catalyst. From about 80 to about 95% of the hydrogens are reacted, and at least a portion of the remaining free hydrogens are cross-linked with cross-linking agents such as tetravinyl silane in the presence of chloroplatinic acid catalyst. Other polydialkyl siloxanes can be correspondingly prepared using polyethylhydrogen siloxane or polypropylhydrogen siloxane.

The amount of substitution affects the crystalline melting point. For example, polymethyltetradecyl siloxane, prior to cross-linking, has a crystalline melting point of 7° C. when 80% of the hydrogen is substituted with tetradecene, 12° C. with 90% substitution, and 14° C. with 100% substitution.

Waveguides consisting of a cladding of cross-linked polymethylpentadecyl siloxane on a glass core were prepared. When the glass core used was a silica core, blackout occurred at about 5° C. When the glass core used was made from sodiumborosilicate, blackout occured at about −1° C.

Preferably a waveguide used in the present invention has a core with a diameter of from about 100 to about 300 microns, and most preferably about 200 microns. With cores of less than 100 microns, it is difficult to couple and connect the waveguide. Furthermore, with a larger core than 100 microns, it is possible to transmit larger amounts of light for longer distances. However, at diameters much greater than 300 microns, the advantages obtained are insufficient to overcome the increased materials costs and breakage caused by bending.

Unless indicated otherwise, all refractive indices mentioned herein refer to the refractive index of a material measured at a temperature of 25° C. with sodium light of 589 nm. However, the waveguides of the present invention are not limited to use with just visible light. They can be used with ultraviolet and infrared light. Thus the term "light" as used herein refers to visible light, ultraviolet light, and infrared light.

The cladding can be applied to the core in situ, where the cladding is cross-linked directly on the core. In applying a cladding to an optical fiber, preferably the fiber is coated before moisture or other contaminants reach the fiber. Also, it is important to avoid scratching or otherwise abrading the fiber because this can drastically reduce the tensile strength of the fiber. With these problems in mind, it is preferred to apply a cladding with a low modulus applicator such as that described by A. C. Hart, Jr., and R. B. Albarino in "An Improved Fabrication Technique For Applying Coatings To Optical Fiber Wave Guides", Optical Fiber Transmission II Proceedings, February 1977. Preferably the cladding material is applied to the fiber core as a liquid.

In some applications it is desirable that the waveguide exhibits substantial change in its light transmission property at two temperatures. For example, when providing freeze protection, it is desirable that the waveguide used exhibits substantial attenuation of transmitted light at a temperature of about 5° C., and then exhibit even more attenuation at about B 1° C. The 5° C. breakpoint can be used as a signal for turning on a heater, and the 1° C. breakpoint can be used as an emergency alarm. A waveguide suitable for such an application is shown in FIG. 5 and its attenuation vs. temperature curve is shown in FIG. 6.

Figure 5:
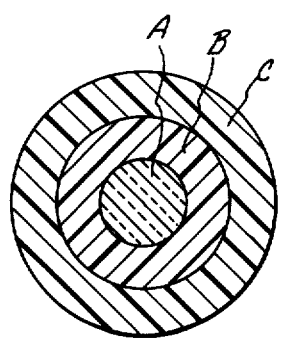
FIG. 5 is a cross-sectional view of a three-layer waveguide.

The waveguide of FIG. 5 comprises a core A, a first light transmissive cladding B disposed on and around the exterior surface of the core, and a second cladding C disposed on and around the exterior surface of the first cladding. The refractive index of the first cladding B is less than the refractive index of the core A at temperatures greater than the first selected temperature $T_1$, and is greater than or equal to the refractive index of the core A at temperatures less than $T_1$. The refractive index of the second cladding C is less than the refractive index of the first cladding B at temperatures greater than the second selected temperature $T_2$ and is greater than or equal to the refractive index of the first cladding B at temperatures less than $T_2$. $T_1$ is greater than $T_2$.

A waveguide of this construction has the attenuation vs. temperature curve as shown in FIG. 6. What occurs is that as the temperature of the waveguide is reduced to $T_1$, which corresponds to about 10° C. in FIG. 6, the refractive index of the first cladding becomes equal to the refractive index of the core. Thus, a portion of the transmitted light is absorbed by the cladding and the attenuation is increased. As the temperature of the waveguide is further decreased, the refractive index of the second cladding becomes equal to the refractive index of the core at $T_2$, which corresponds to about 0° C. in FIG. 6. At this point, blackout occurs.

To be readily detectable, preferably the level of attenuation that occurs at temperatures less than $T_1$ is at least 3 db greater than the level of attenuation at temperatures greater than $T_1$. Also, preferably the level of attenuation that occurs at temperatures greater than $T_2$ is at least about 3 db greater than the level of attenuation at temperatures between $T_1$ and $T_2$. The amount of attenuation that occurs at temperatures less than $T_1$ can be controlled by varying the thickness of the first cladding. The smaller the thickness, the less attenuation that occus. Preferably the first cladding layer is thinner than the second cladding layer, and generally is on the order of about 5 microns thick vs. about 20 microns thick for the second cladding layer.

An example of a waveguide that exhibits this twostep change in attenuation is one consisting of a silica core, a first cladding layer of cross-linked polymethylphenyl siloxane, and a second cladding of polydimethyl siloxane. For such a cladding, $T_1$ is 14° C., and $T_2$ is −52° C.

Figure 7:
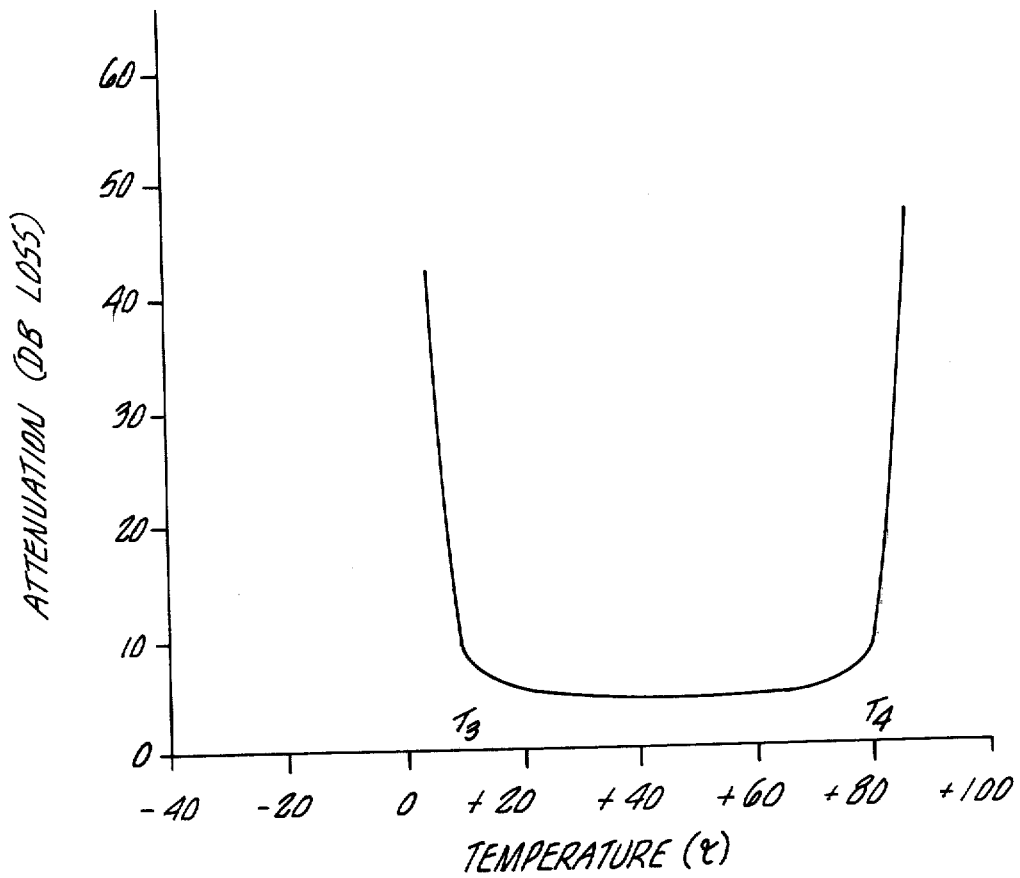
FIG. 7 is a graph of attenuation vs. temperature for a three layer waveguide where the inner and outer layers are cladding material and the middle layer is a light transmissive material.

In some applications it is desirable that a single waveguide exhibit blackout at both ends of a selected temperature range of $T_3$ to $T_4$. The attenuation vs. temperature curve of such a waveguide is shown in FIG. 7, where light is transmitted without substantial attenuation between about 10° C. to about 80° C., but at about 10° C. and 80° C., blackout occurs. A waveguide with this performance characteristic can have the construction shown in FIG. 5, where it comprises a core A of high loss material, a light transmissive layer B disposed on and around the exterior surface of the core, and an exterior cladding C disposed on and around the exterior surface of the light transmissive layer B. The core A is a poorer transmitter of light at temperatures lower than or equal to $T_3$ than is the light transmissive layer. The refractive index of the light transmissive layer B is greater than the refractive indices of both the core A and the exterior cladding C only at temperatures within the selected temperature range of $T_3$ to $T_4$, $T_3$ being less than $T_4$. At temperatures less than $T_3$, the refractive index of the core A is greater than or equal to the refractive index of the light transmissive layer B so that light is no longer contained by the core A in the light transmissive layer B. Because the core A is made of a high loss material, light passing into the core is absorbed and blackout occurs. At temperatures greater than $T_4$, the refractive index of the exterior cladding C is greater than or equal to the refractive index of the light transmissive layer B. Because C is a less light transmissive material than B, there is an increase in attenuation at temperatures greater than $T_4$.

The change in refractive index vs. temperature for the components of a waveguide constructed in accordance with this version of the invention is shown in FIG. 8. These refractive index curves correspond to the attenuation curve shown in FIG. 7. As shown in FIG. 8, the refractive index of the core A is less than the refractive index of the light transmissive layer B at temperatures greater than about 10° C.($T_3$). At temperatures greater than about 80° C.($T_4$), the refractive index of the exterior cladding C is greater than the refractive index of the light transmissive layer B.

A waveguide having the attenuation vs. temperature curve shown in FIG. 7 can comprise a core A made of polymethyltetradecyl siloxane, a light transmissive layer B of polymethylphenyl siloxane of 35% by weight phenyl content, and an outer cladding C of silica, coated with an absorptive layer of methylphenyl siloxane having a phenyl content of 50% by weight and containing 5% by weight of carbon black.

Another waveguide having the attenuation vs. temperature curve of FIG. 7 can be prepared where the refractive index of the core A is greater than or equal to the refractive index of the light transmissive layer B at temperatures greater than or equal to $T_4$, and the refractive index of the exterior cladding C is greater than or equal to the refractive index of the light transmissive layer B at temperatures less than or equal to $T_3$. The core A is a poorer light transmitter at temperatures greater than or equal to $T_4$ than is the light transmissive layer B.

As described above, in some applications, it is desirable that once a waveguide undergoes a substantial change in its light transmission properties, that change be permanent and irreversible. An example of such a waveguide is one having a polyvinylidene fluoride (available under the trade name Kynar from Pennwalt) core or polymethylmethacrylate core, and a cladding of polydimethyl siloxane. The core is loaded with about 1% by weight of an antioxidant such as 2, 6 di-teriary butyl para-cresol. When the loaded core is irradiated with gamma rays to 5 mrads, it becomes colored due to the color centers produced by the antioxidant and light transmission is only substantially reduced. However, when the temperature of the core is raised up to about its melting point, the color centers are permanently eliminated. Thus, once a waveguide with a core having color centers is heated up to about the melting point of the core, the waveguide is permanently changed to one that can transmit light.

As noted above, only a portion of a waveguide needs to exhibit blackout as a result of a temperature change. Thus a waveguide can have portions which exhibit blackout at a selected temperature or within a selected temperature range, where the portions are separated by a portion that does not exhibit blackout at the selected temperature or within the selected temperature range. This effect can be achieved with waveguides where portions of the waveguide have different claddings and/or different cores. This is particularly useful when the sensing element exhibits relatively poor transmission properties even when it is operating in its mode of transmitting light.

In addition, a single waveguide can include a plurality (two or more) of sensing elements which exhibit blackout at different temperatures. For example, one sensing element can be activated at about 0° C. as cooled and another sensing element can be activated at about 100° C. as heated. With such a waveguide, light can be transmitted only from about 0° to 100° C. Such a waveguide can be used as part of a system for keeping water liquid.

Figure 9:
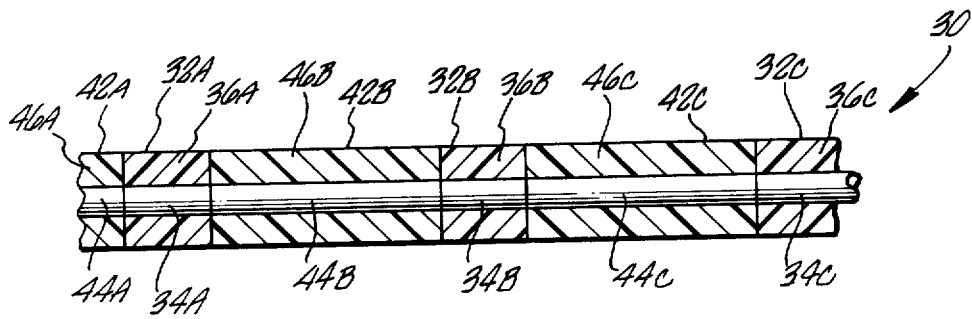
FIG. 9 shows a waveguide having sections with different light transmitting properties.

A waveguide 30 comprising a plurality of sensing elements 32A, 32B, and 32C separated from each other by light transmitting elements 42A, 42B, and 42C is shown in FIG. 9. Each sensing element comprises a core 34A, 34B, and 34C, respectively, and a cladding 36A, 36B, and 36C, respectively, disposed on and around the exterior surface of the core. Each sensing element 32 exhibits blackout at a temperature at which the light transmitting elements 42 transmit light. Each light transmitting element 42A, 42B, and 42C comprises a core 44A, 44B, and 44C, respectively, and a cladding 46A, 46B, and 46C, respectively, disposed on and around the exterior surface of the core.

The sensing elements can have the same blackout temperature, or can have different blackout temperatures. Although the sensing elements shown in FIG. 9 are separated by light transmitting elements, sensing elements having different blackout temperatures can be adjoining.

All the sensing elements can have the same core material or have different core materials. All the sensing elements can have the same cladding or different claddings. Likewise, the light transmitting elements can all have the same core or different cores and can all have the same cladding or different claddings. Furthermore, the cores of the light transmitting elements and the sensing elements can be the same or different. Likewise the claddings of the sensing elements and the light transmitting elements can be the same or different. However, it is necessary that at least the cladding or the core of the light transmitting elements and the sensing elements be different so that the sensing elements exhibit blackout at a temperature at which the light transmitting elements transmit light.

In many applications, the light transmitting elements are substantially longer than the sensing elements. Each sensing element can be in the order of one to two centimeters long, while the light transmitting elements can be as long as a kilometer. For example, when the waveguide 30 of FIG. 9 is used for freeze protection along a pipeline, the sensing elements 32 can be spaced every 50 feet apart, where the waveguide 30 has a total length of about a kilometer.

Exemplary of a waveguide comprising sensing elements 32 and light transmitting elements 42 is one having a cellulose ester core (i.e. Cellidor CPHH made by Bayer A. G. and having a refractive index of 1.470), the light transmitting element 42 having a cladding 46 of polydimethyl siloxane, and the sensing element 32 having a cladding 46 of silica with an exterior absorptive layer of methylphenyl siloxane of 1.5 refractive index and containing 5% by weight of carbon black. The light transmitting elements transmit light at all temperatures in excess of −52° C. The sensing elements exhibit blackout at an elevated temperature of about 80° C.

Exemplary of another waveguide comprising sensing elements 32 and light transmitting elements 42 is one having a Kynar copolymer cladding (copolymer of vinylidene fluoride and tetrafluoroethylene made by Pennwalt), a sensing element core 34 of polymethylphenylsiloxane, containing 7% phenyl by weight, and a light transmitting element core 44 of silica. The sensing elements blackout at about 90° C. The light transmitting elements transmit light up to temperatures greater than 90° C.

Another waveguide comprising sensing elements 32 and light transmitting elements 42 has a core of cellulose ester (of refractive index 1.47), a light transmitting element cladding 46 of polydimethyl siloxane, a first sensing element cladding 36A of silica with an exterior absorptive layer of polymethylphenyl siloxane of 1.5 refractive index and containing 5% of carbon black by weight and a second sensing element cladding 36B of polymethyltetradecyl siloxane. The first sensing element 32A exhibits blackout at a temperature of about 80° C., transmitting light at temperatures less than the blackout temperature. The second sensing element 32B exhibits blackout at about 14° C., transmitting light at temperatures in excess of 14° C. The light transmitting elements 42 transmit light at temperatures greater than about −52° C.

A method for making such a waveguide 30 with different temperature responsive sections is to remove a portion of the cladding from a conventional waveguide and replace the removed portion of the cladding with cladding that results in the waveguide having a temperature responsive sensing element. For example, a two centimeter length of the cladding can be removed from a waveguide comprising silica core and a GE670 cladding (a branched polydimethylsiloxane). The cladding can be removed with wire strippers, followed by removal of any residue with tetramethylguanidine, followed by a rinse with toluene and then isopropanol. The waveguide is maintained in a position so that the bare core can be surrounded with uncured cladding which can be cured in position. The replacement cladding can be a methylphenylsiloxane whose refractive index controls the blackout temperature, or a methylalkylsiloxane in which the blackout temperature depends on the crystalline melting point of the cladding.

Another method for preparing a waveguide having a short sensing element is to dope the cladding of a waveguide at selected locations with a dopant that alters the refractive index of the cladding.

Rather than curing a replacement cladding in situ to replace a cladding that has been stripped from the waveguide, the replacement cladding can be placed inside a heat shrinkable sleeve. The heat shrinkable sleeve can be placed in position over an area of the waveguide where the cladding has been removed and then heated, thereby shrinking the sleeve. The coating on the inside of the sleeve can then provide a cladding having refractive index properties that the waveguide has a useful sensing element.

Another method for producing a single waveguide having one or more sensing elements along its length, where the sensing elements can exhibit a substantial change in light transmission properties at different temperatures, is to pass the core through two applicators which are in tandem. By using a starve-feed system to each of the applicators, different claddings having different refractive index characteristics can be applied to different lengths of the core.

The following examples present waveguides useful in the present invention.

EXAMPLE 1

The Example shows how a novel waveguide having a blackout temperature of about 0° C. for use in freeze protection can be prepared.

Figure 10:
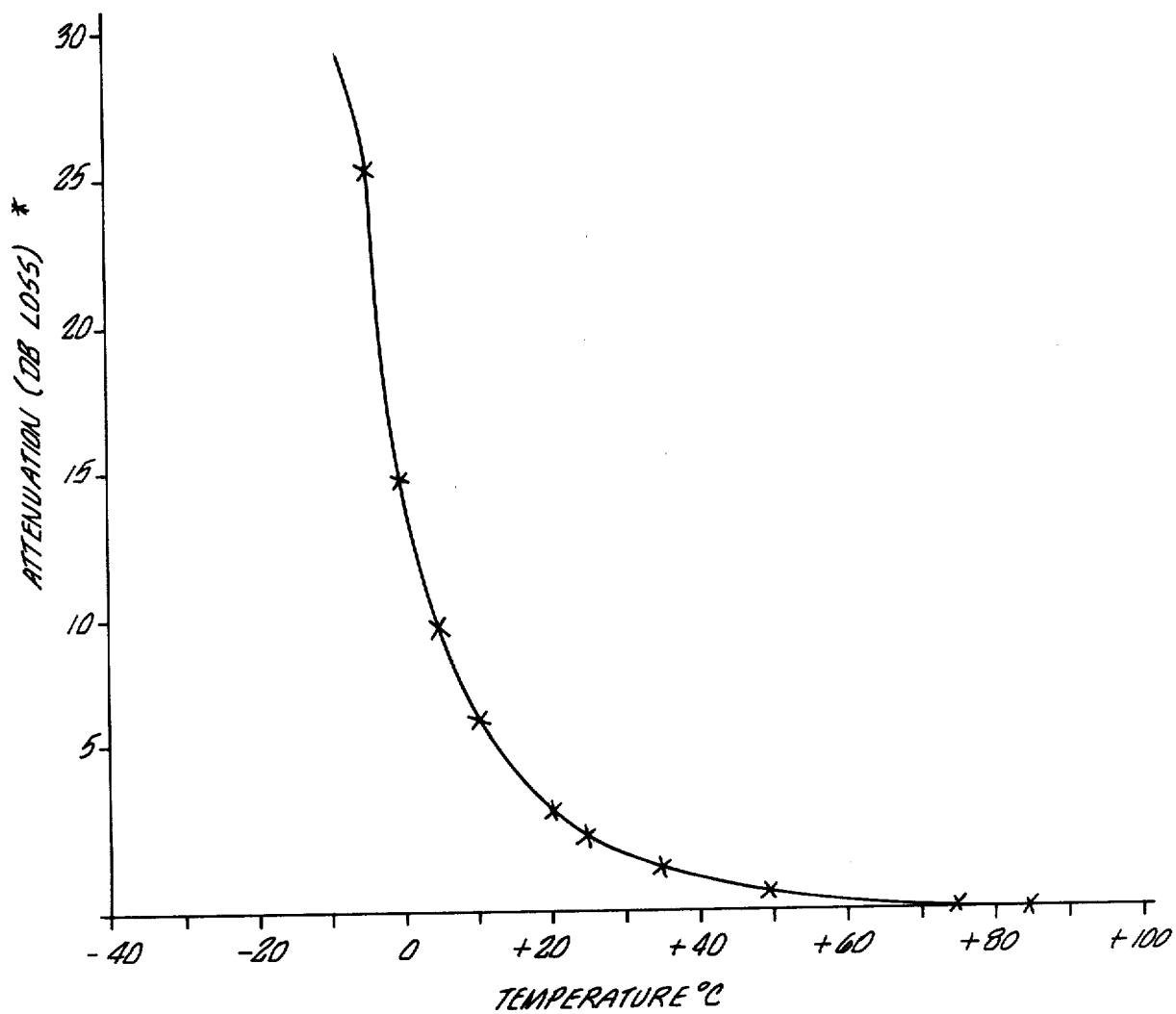

A nine meter length of waveguide comprising a 200 micron fused silica core and a cladding of about 30 microns thick of polydimethylsiloxane available under the trade name GE670 was prepared. A two centimeter length of the cladding was mechanically stripped. Any residue present was removed with tetramethylguanidine and rinsed with toluene and isopropanol. The waveguide was held in a fixed position and the uncoated fiber was surrounded with a methylphenylsiloxane solution. The solution consisted of 21.84% of a methylphenylsiloxane containing 15.5% phenyl by weight, 58.16% of a methylphenylsiloxane containing 20.5% phenyl by weight, and 20% of a methylphenylsiloxane containing 7% phenyl by weight. The refractive index of the solution before curing was 1.4466 and after curing in situ in the presence of a chloroplatinic acid catalyst, the refractive index was 1.4498. The thickness of the new cladding was about ⅛ inch. The attenuation vs. temperature curve for the waveguide is presented in FIG. 10.

EXAMPLE 2

Using the same waveguide originally used for Example 1, a two centimeter length of the polydimethylsiloxane cladding was replaced with a siloxane composition containing 43% by weight phenyl and having a refractive index of 1.513 before curing. The waveguide did not transmit light at room temperature. However, as shown in FIG. 11, at temperatures above 160° C., the waveguide did transmit light.

EXAMPLE 3

This example demonstrates preparation of a novel waveguide that cannot transmit light at ambient temperature, but when raised to an elevated temperature, irreversibly changes so that it can transmit light, even after its temperature is reduced to ambient temperature.

A waveguide was prepared having a core of polymethylmethacrylate having a diameter of 0.013 inch. The cladding was polydimethylsiloxane having a thickness of about 50 microns. A second waveguide was prepared, differing from the first waveguide in that it contained 1% by weight of Irganox 1010, an antioxidant available from Ciba Geigy. When light from a helium neon laser was directed through each of the waveguides, the first waveguide transmitted light along the length of 22 inches and the second waveguide transmitted light satisfactorily along a length of 28 inches as detected visually by the experimentor.

Both fibers were irradiated with a high energy electron beam of 10 Mrads. The first fiber still allowed light to transmit an amount of 60% of the previous length. However, the second fiber would not allow any light to be transmitted. The second fiber was heated to 80° C. for two hours and was then able to transmit light in an amount of 50% of its original transmission properties, even after its temperature was reduced to ambient temperature.

A wide variety of applications are available for using the waveguides described above. Some of these applications are described in detail in the aforementioned Clarke et al application Ser. No. 136,057, filed Mar. 31, 1980.

An additional application is that the waveguides of the present invention can also be used for detecting fires. This is effected by placing at least part of a waveguide in a position proximate to a combustible material so that the temperature of the waveguide is higher than ambient temperature when the combustible material is on fire. The waveguide is chosen so that its light transmission properties exhibit a substantial change when the temperature of the waveguide is higher than ambient temperature, i.e., either the waveguide changes from a blackout condition to a light transmitting condition or the waveguide changes from a light transmitting condition to a blackout condition. Light is directed at one end of the waveguide, and the intensity of the light transmitted by the waveguide is monitored. At the onset of the substantial change, an alarm can be activated and/or a sprinkler system can be activated.

Although the present invention has been described in considerable detail with reference to certain versions thereof, other versions are possible. Therefore the spirit and scope of the appended claims should not necessarily be limited to the description of the preferred versions contained herein.

What is claimed is:

1. A waveguide comprising two connected sections, a first section and a second section, the first section comprising a first solid core and a first solid cladding disposed on and around the exterior surface of the first core, and the second section comprising a second solid core and a second solid cladding disposed on and around the exterior surface of the second core, the first section of the waveguide exhibiting blackout at a first temperature $T_1$, the second section being capable of transmitting light at $T_1$.

2. The waveguide of claim 1 in which the first core and the second core are of the same material.

3. The waveguide of claim 1 or 2 in which the second section of the waveguide exhibits blackout at a second temperature $T_2$, the first section being capable of transmitting light at $T_2$.

4. The waveguide of claim 1 or 2 including a third section comprising a third core and a third cladding disposed on and around the exterior surface of the third core, the third section of the waveguide exhibiting blackout at a third temperature $T_3$, the first and second sections being capable of transmitting light at $T_3$.

5. The waveguide of claim 4 in which the first, second and third cores are all of the same material.

6. A waveguide comprising a plurality of sensing elements separated from each other by light transmitting elements, each sensing element comprising a solid sensing core and a solid sensing cladding disposed on and around the exterior surface of the sensing core, and each light transmitting element comprising a solid transmitting core and a solid transmitting cladding disposed on and around the exterior surface of the transmitting core, each sensing element exhibiting blackout at a temperature at which the light transmitting elements are capable of transmitting light.

7. The waveguide of claim 6 in which the cores of the sensing elements and the cores of the light transmitting elements are of the same material.

8. The waveguide of claim 6 in which the core of at least one sensing element and the core of at least one light transmitting element are of the same material.

9. The waveguide of claim 6 comprising two sensing elements.

10. The waveguide of claim 6 in which at least one sensing element has a different blackout temperature than another sensing element.

11. The waveguide of claim 6 in which all the sensing elements have cores of the same material.

12. The waveguide of claim 6 or 11 in which the light transmitting elements have cores of the same material.

13. A waveguide comprising a solid core and a first section of solid cladding disposed on and around the exterior surface of the core, and a second section of solid cladding disposed on and around the exterior surface of the core, the first section and the second section being of different compositions.

14. The waveguide of claim 13 in which the refractive indices of both sections of cladding are less than the refractive index of the core at all temperatures less than a temperature $T_1$, and at temperatures greater than $T_1$ the refractive index of the first section of cladding is greater than the refractive index of the core while the refractive index of the second section of cladding remains less than the refractive index of the core.

15. The waveguide of claim 13 in which the refractive indices of both sections of cladding are less than the refractive index of the core at all temperatures greater than a temperature $T_1$, and at temperatures less than $T_1$, the refractive index of the first section of cladding is greater than the refractive index of the core while the refractive index of the second section of cladding remains less than the refractive index of the core.

16. A method for preparing a waveguide comprising a core and a first section of solid cladding disposed on and around the exterior surface of the core and a second section of solid cladding disposed on and around the exterior surface of the core, the first section comprising a first material and the second section comprising a second material, the first and second materials being different, the method comprising the steps of:
  (a) fabricating a waveguide comprising a solid core and a first solid cladding comprising the first material;
  (b) removing a section of the first solid cladding; and
  (c) curing the second solid cladding in situ on the section of the core with the first cladding removed therefrom.

17. A method for preparing a waveguide comprising a solid core and a first section of solid cladding disposed on and around the exterior surface of the core and a second section of solid cladding disposed on and around the exterior surface of the core, the first section comprising a first material and the second section comprising a second material, the first and second materials being different, the method comprising the steps of:
  (a) fabricating a waveguide comprising a solid coare and a first solid cladding comprising the first material;
  (b) removing a section of the first solid cladding; and
  (c) heat shrinking a heat-recoverable sleeve onto the section of the core with the first cladding removed therefrom, the sleeve having an insert of the second solid cladding.

18. A method for preparing a waveguide comprising a solid core and a first section of solid cladding disposed on and around the exterior surface of the core and a second section of solid cladding disposed on and around the exterior surface of the core, the first section comprising a first material and the second section comprising a second material, the first and second materials being different, the method comprising the steps of:
  (a) fabricating a waveguide comprising a solid core and a first solid cladding comprising the first material; and
  (b) doping a section of the first solid cladding with a dopant that alters the refractive index of the first cladding, thereby forming the second material.

19. A method for detecting fires comprising the steps of:
  (a) placing at least part of a waveguide in a position proximate to a combustible material so that the temperature of the waveguide is higher than ambient temperature when the combustible material is on fire, the waveguide comprising a fiber core and a cladding disposed on and around the exterior surface of the core, the waveguide exhibiting blackout when the temperature of said part is at a blackout temperature that is higher tham ambient temperature but less than 200° C.;
  (b) directing light at an end of the waveguide;
  (c) monitoring the intensity of light transmitted by the waveguide, the onset of a substantial change in intensity indicating that the combustible material is on fire; and (d) stopping the fire.

20. A waveguide comprising a solid core and a solid cladding disposed on and around the exterior surface of the core, at least a portion of the waveguide exhibiting blackout at a blackout temperature greater than about $-20°$ C. and less than about 200° C.

21. The waveguide of claim 20 wherein said portion exhibits blackout at about 0° C.

22. The waveguide of claim 20 or 21 wherein said portion exhibits blackout at a temperature less than about 100° C.

23. The waveguide of claim 20 wherein at temperatures greater than the blackout temperature, said portion is capable of transmitting light without substantial attenuation and at temperatures less than the blackout temperature, said portion is not capable of transmitting light.

24. The waveguide of claim 20 wherein at temperatures less than the blackout temperature, said portion is capable of transmitting light without substantial attenuation and at temperatures greater than the blackout temperature, said portion is not capable of transmitting light.

25. The waveguide of claim 20 wherein at least a portion of the waveguide is capable of transmitting light with a first attenuation at temperatures less than the blackout temperature and is capable of transmitting light with a second attentuation at temperatures greater than the blackout temperature, the first and second attenuation differing by at least about 3 dB.

26. The waveguide of claim 20 wherein at least two portions of the waveguide exhibit blackout at a blackout temperature greater than about $-20°$ C. and less than about 200° C., said portions being separated by a portion that does not exhibit blackout at the selected temperature.

27. A waveguide comprising a solid core and a solid cladding disposed on and around the core, the index of refraction of the cladding being greater than or equal to the index of refraction of the core at temperatures of $T_1$ and less, $T_1$ being greater than about $-20°$ C., and less than about 200° C., the index of refraction of the cladding being less than the index of refraction of the core at temperatures greater than $T_1$.

28. The waveguide of claim 27 wherein $T_1$ is about 0° C.

29. The waveguide of claim 27 wherein $T_1$ is greater than 0° C.

30. A waveguide comprising a core and cladding disposed thereon, the cladding having a crystalline melting point greater than $-20°$ C., the refractive index of the cladding being less than the refractive index of the core at temperatures greater than the crystalline melting point of the cladding and being greater than or equal to the refractive index of the core at temperatures less than or equal to the crystalline melting point.

31. The waveguide of claim 30 in which the cladding comprises a copolymer of dimethylsiloxane and ethylene oxide.

32. The waveguide of claim 30 in which the cladding comprises a cross-linked polydialkyl siloxane.

33. A waveguide comprising a core and cladding disposed on and around the exterior surface of the core, the cladding comprising a polyalkylphenyl siloxane, the refractive index of the cladding being less than the refractive index of the core at temperatures greater than a temperature $T_1$, the polyalkylphenyl siloxane containing sufficient phenyl that at temperatures less than $T_1$, the refractive index of the cladding is greater than the refractive index of the core so that the waveguide exhibits blackout at $T_1$ and is capable of transmitting light without substantial attenuation at temperatures greater than $T_1$, wherein $T_1$ is no higher than 15° C.

34. The waveguide of claim 33 in which the cladding comprises a polymethylphenyl siloxane.

35. The waveguide of claim 34 in which the phenyl content of the polymethylphenyl siloxane is at least about 15% by weight based upon the total weight of the siloxane.

36. The waveguide of claim 33 in which the cladding comprises a blend of two methylphenyl siloxanes of different phenyl content, the refractive index of the two methylphenyl siloxanes being different by no more than 0.02 and the viscosity of both methylphenyl siloxanes being in the range of 500 to 10,000 cps.

37. The waveguide of claim 33 wherein $T_1$ is 10° C.

38. The waveguide of claim 33 wherein $T_1$ is 5° C.

39. The waveguide of claim 33 wherein $T_1$ is 0° C.

40. A waveguide comprising a fiber core and a cladding disposed on and around the exterior surface of the core, the cladding having a crystalline melting point greater than $-20°$ C., the refractive index of the cladding being less than the refractive index of the core at temperatures greater than the crystalline melting point of the cladding and being greater than or equal to the refractive index of the core at temperatures less than or equal to the crystalline melting point, the cladding comprising a cross-linked polydialkyl siloxane comprising the unit:

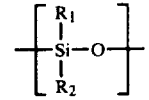

where each $R_1$ in a polymer chain is independently selected from the group consisting of methyl, ethyl, and propyl groups; and where each $R_2$ in a polymer chain is independently an alkyl group of at least 10 carbon atoms and the $R_1$'s in a polymer chain can be the same or different and the $R_2$'s in a polymer chain can be the same or different.

41. The waveguide of claim 40 in which each $R_1$ is a methyl group.

42. The waveguide of claim 40 or 41 wherein each $R_2$ is tetradecane.

43. The waveguide of claim 40 or 41 wherein a portion of the $R_2$'s are tetradecane.

44. The waveguide of claim 40 wherein each $R_2$ is a linear alkyl group.

45. A waveguide comprising a solid core and a solid cladding disposed on and around the core, the index of refraction of the cladding being greater than or equal to the index of refraction of the core at temperatures of $T_1$ and greater, $T_1$ being greater than about $-20°$ C., and less than about 200° C., the index of refraction of the cladding being less than the index of refraction of the core at temperatures less than $T_1$.

46. The waveguide of claim 45 wherein $T_1$ is about 0° C.

47. The waveguide of claim 45 wherein $T_1$ is greater than 0° C.

48. A waveguide comprising a solid core and solid cladding disposed thereon, the core having a crystalline melting point greater than −20° C., the refractive index of the core being less than the refractive index of the cladding at temperatures greater than the crystalline melting point of the core and being greater than or equal to the refractive index of the cladding at temperatures less than or equal to the crystalline melting point.

49. A waveguide comprising a fiber core and a cladding disposed on and around the exterior surface of the core, the core having a crystalline melting point greater than −20° C., the refractive index of the core being less than the refractive index of the cladding at temperatures greater than the crystalline melting point of the core and being greater than or equal to the refractive index of the cladding at temperatures less than or equal to the crystalline melting point, the core comprising a cross-linked polydialkyl siloxane comprising the unit:

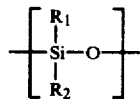

where each $R_1$ in a polymer chain is independently selected from the group consisting of methyl, ethyl, and propyl groups; and where each $R_2$ in a polymer chain is independently an alkyl group of at least 10 carbon atoms and the $R_1$'s and $R_2$'s in a polymer chain can be the same or different.

50. The waveguide of claim 49 in which each $R_1$ is a methyl group.

51. The waveguide of claim 49 wherein each $R_2$ is tetradecane.

52. The waveguide of claim 49 wherein a portion of the $R_2$'s are tetradecane.

53. The waveguide of claim 49 wherein each $R_2$ is a linear alkyl group.

54. A waveguide comprising a core, a first light transmissive cladding disposed on and around the exterior surface of the core, and a second cladding disposed on and around the exterior surface of the first cladding, the refractive index of the first cladding being less than the refractive index of the core at temperatures less than a first temperature, $T_1$, and being greater than or equal to the refractive index of the core at temperatures greater than $T_1$, the refractive index of the second cladding being less than the refractive index of the first cladding at temperatures less than a second temperature, $T_2$, and greater than or equal to the refractive index of the first cladding at temperatures greater than $T_2$, $T_2$ being greater than $T_1$, wherein at temperatures less than $T_1$ the waveguide is capable of transmitting light through the core, and at temperatures less than $T_2$ and greater than $T_1$, the waveguide is capable of transmitting light through the first cladding, and at temperatures greater than $T_2$, substantially no light is transmitted through the core and the first cladding.

55. The waveguide of claim 54 wherein the thickness of the first cladding is less than the thickness of the second cladding.

56. A waveguide comprising a core and cladding disposed thereon, the cladding having a crystalline melting point of about 1° C., the refractive index of the cladding being less than the refractive index of the core at temperatures greater than the crystalline melting point of the cladding and being greater than or equal to the refractive index of the core at temperatures less than or equal to the crystalline melting point.

57. A waveguide comprising a fiber core and a cladding disposed on and around the exterior surface of the core, the cladding having a crystalline melting point greater than −20° C., the refractive index of the cladding being less than the refractive index of the core at temperatures greater than the crystalline melting point of the cladding and being greater than or equal to the refractive index of the core at temperatures less than or equal to the crystalline melting point, the cladding comprising a cross-linked polydialkyl siloxane comprising the unit:

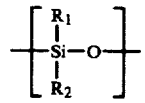

where each R1 in a polymer chain is independently selected from the group consisting of methyl, ethyl, and propyl groups; and where a portion of the R2's are independently alkyl groups of at least 10 carbon atoms and a portion of the R2's are fluorine substituted groups, wherein the R1's in a polymer chain can be the same or different.

58. The waveguide of claim 57 wherein a portion of the R2 groups are tri-fluoro propyl.

59. A waveguide comprising a fiber core and a cladding disposed on and around the exterior surface of the core, the cladding having a crystalline melting point greater than −20° C., the refractive index of the cladding being less than the refractive index of the core at temperatures greater than the crystalline melting point of the cladding and being greater than or equal to the refractive index of the core at temperatures less than or equal to the crystalline melting point, the cladding comprising a cross-linked polydialkyl siloxane comprising the unit:

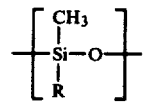

where a portion of the R's are alkyl groups of at least 10 carbon atoms and a portion of the R's are trifluoropropyl.

* * * * *